United States Patent [19]

Graves

[11] Patent Number: 5,354,851

[45] Date of Patent: Oct. 11, 1994

[54] PROCESS FOR PRODUCING CRUDE PECTIN THROUGH ION EXCHANGE

[75] Inventor: Frederic A. Graves, Ham Lake, Minn.

[73] Assignee: Humanetics Corporation, Chaska, Minn.

[21] Appl. No.: 40,891

[22] Filed: Mar. 31, 1993

[51] Int. Cl.$^5$ .......................... C08B 37/06; C07H 1/00
[52] U.S. Cl. ...................................... 536/2; 536/124; 426/577
[58] Field of Search ...................... 536/124, 2; 426/577

[56] References Cited

U.S. PATENT DOCUMENTS

| | | | |
|---|---|---|---|
| 67,229 | 7/1867 | Tiffany | 536/101 |
| 2,117,100 | 5/1938 | Milas | 204/156 |
| 2,531,431 | 11/1950 | Hills | 426/321 |
| 2,572,923 | 10/1951 | Gaver et al. | 536/121 |
| 3,676,158 | 7/1972 | Fischer et al. | 426/293 |
| 3,966,984 | 6/1976 | Cocke et al. | 426/472 |
| 3,982,003 | 9/1976 | Mitchell | 426/574 |
| 4,238,318 | 12/1980 | Kouwenhoven et al. | 208/120 |
| 4,268,533 | 5/1981 | Williams et al. | 426/577 |
| 4,520,017 | 5/1985 | Tunc | 514/54 |
| 4,686,106 | 9/1987 | Ehrlich et al. | 426/577 |
| 4,824,672 | 4/1989 | Day | 424/195.1 |
| 4,857,331 | 8/1989 | Shaw et al. | 424/440 |
| 4,950,687 | 8/1990 | Yang et al. | 514/548 |
| 5,068,109 | 11/1991 | Foldager et al. | 424/441 |
| 5,118,510 | 6/1992 | Kuhrts | 424/451 |

FOREIGN PATENT DOCUMENTS

| | | |
|---|---|---|
| 2283907 | 9/1974 | France . |
| 91/04674 | 9/1990 | PCT Int'l Appl. . |
| 91/15517 | 5/1991 | PCT Int'l Appl. . |
| 2177100 | 6/1986 | United Kingdom . |

OTHER PUBLICATIONS

Camire and Clydsdale, Effect of pH and Heat Treatment on the Binding of Calcium, Magnesium, Zinc, and Iron to Wheat Bran and Fractions of Dietary Fiber, vol. 46, pp. 548–551 (1981), *Journal of Food Science.*

Anderson et al., Dietary Fiber and Coronary Heart Disease, vol. 29, Issue 2, pp. 95–147, (1990), *Food Science and Nutrition.*

Colloidal Dispersions: Polysaccharide Gums, p. 169, *Encyclopedia of Food Science.*

Hoagland and Pfeffer, Cobinding of Bile Acids to Carrot Fiber, vol. 35, pp. 316–319 (1987), *J. Agric Food Chem.*

Hoagland, Binding of Dietary Anions to Vegetable Fiber, vol. 37, No. 5, pp. 1343–1347 (1989), *J. Agric. Food Chem.*

Hoagland and Fishman, Interactions of Calcium Pectate with Phytate, AGFD No. 74.

Cellulose, vol. 4, pp. 593–614, *Kirk–Othmer, Encyclopedia of Chemical.*

Abstract, Why Carrots may Reduce Cholesterol, 27 Jun. 1987.

Hoagland, et al., ACS Symp., Series 1986, 310 266–74 Chemical Abstracts vol. 105, 1986, Abstract 113884W.

Lopez, Canning of Vegetables, 10th Ed., pp. 340–341, *A Complete Course in Canning.*

Lopez, Vegetables, 8th Ed., pp. 84–85, *A Complete Course in Canning.*

McFeeters, Pectin Methylation Changes and Calcium Ion Effects on the Texture of Fresh, Fermented, and Acidified Cucumbers, pp. 217–230, (1986) *Chemistry and Function of Pectins.*

Owens, et al., Methods Used at Western Regional Research Laboratory for Extraction and analysis of Pectic Materials, Jun., 1952.

*Primary Examiner*—John W. Rollins
*Assistant Examiner*—Everett White
*Attorney, Agent, or Firm*—Faegre & Benson

[57] ABSTRACT

An environmentally-friendly process for producing a low-cost, crude, human-consumable, pectic material containing fiber which includes the steps of (i) reacting an aqueous slurry of an edible fiber with an alkaline earth metal electrolyte, (ii) separating the slurry into a pectin-rich solid fraction and a pectin-poor liquid fraction, (iii) passing the fiber through an ion exchange column to exchanging H$^-$ ions for the previously added alkaline earth metal ions on the pectin component of the fiber, and (iv) drying the fiber.

15 Claims, No Drawings

PROCESS FOR PRODUCING CRUDE PECTIN THROUGH ION EXCHANGE

FIELD OF THE INVENTION

The invention broadly relates to processes for producing pectin and the resultant pectin product. Specifically, the invention relates to methods for producing a low-cost, crude, pectic material containing product having the gelling effect associated with refined pectin.

BACKGROUND OF THE INVENTION

Pectin, along with cellulose, hemicellulose and lignin, constitute the major components of plant tissue. The cellulose, hemicellulose and lignin portions are located within the cell structure where they provide support to the cell. The pectic portion is located between cells where it acts as a biological adhesive to hold the cells together.

Pectin is a water soluble, branched polysaccharide consisting of D-galacturonate units joined by $\alpha$-1,4 glycosidic bonds interrupted with 1,2 L-rhamnose residues. The neutral sugars D-galactose, L-arabinose, D-xylose, and L-fucose form side chains from the $\alpha$-1,4 glycosidic backbone. The $\alpha$-1,4 glycosidic backbone includes about 5-10% by weight methylated carboxyl groups and about 5-10% by weight alpha acetyl groups. The molecular weight of pectin varies greatly from about 20,000 for sugar beet pectin up to about 200,000 for apple and citrus pectins.

Refined pectin is generally extracted from plant tissue, such as citrus pulp, by (i) treating the plant tissue with an acid (pH less than about 2) or base (pH greater than about 10) until the pectin component of the tissue is separated from the other components, (ii) solubilizing the free pectin, (iii) separating the pectin-containing liquid from the pectin-depleted solids, and (iv) precipitating the pectin by addition of a hydrocarbon precipitating agent, such as an alcohol.

Refined pectin is widely used in the food industry as a gelling agent. However, the high cost of refined pectin has limited the extent to which pectin is used. While the pectin-producing industry has long recognized the need for a low-cost, food-grade pectic material product, efforts to produce such a crude pectic material product has meet with limited success.

Grindsted (PCT Publication 91/15517) discloses a gelling composition comprising a crude fiber, such as carrot fiber, which has been (i) heat treated with acid, such as hydrochloric acid, at a pH of about 1-3 to convert insoluble pectin in the fiber to soluble pectin, (ii) treated with a base, such as calcium hydroxides to increase the pH of the fiber to about 3-8, and then (iii) dried by evaporative methods to form a dry, crude, pectic material containing fiber product.

While the process of Grindsted is significantly less expensive than the process used to produce fully refined pectin, the Grindsted process is slow (requires the fiber to be treated with an acid for several hours to achieve appreciable conversion of the pectin), requires the use and disposal of substantial quantities of environmentally hazardous acids, and requires the use of a considerable amount of energy to evaporatively dry the pH treated fiber.

Accordingly, a substantial need still exists for a simple, low-cost, environmentally-friendly method for producing a crude pectic material containing product possessing the gelling characteristic of refined pectin.

SUMMARY OF THE INVENTION

We have discovered an environmentally friendly process for producing a low-cost, crude, human-consumable, pectic material containing fiber possessing the gelling effect of fully refined pectin.

The process includes the steps of (i) forming an aqueous pulp slurry, (ii) reacting the pulp with a reactant(s) capable of chemically coupling an alkaline earth metal ions to the pectin component of the pulp so as to render the pectin substantially water-insoluble, (iii) separating the slurry into a pectin-rich solid fraction and a pectin-poor liquid fraction so as to remove water-soluble pulp components from the fibers (iv) exchanging $H^+$ ions for the $Ca^{++}$ ions on the pectin component of the fiber, and then (v) drying the fiber.

The exchange of $H^+$ ions for the $Ca^{++}$ ions on the pectin component of the fiber may be effected by milling the pulp and passing an aqueous slurry of the milled pulp through a suitable ion exchange column.

DETAILED DESCRIPTION OF THE INVENTION INCLUDING A BEST MODE

Definitions

As utilized herein, the term "chemically coupled" refers to the covalent and noncovalent bonding of molecules and includes specifically, but not exclusively, covalent bonding, electrostatic bonding, hydrogen bonding and van der Waals' bonding.

As utilized herein, the terms "edible" and "dietary" refer to material suitable for human consumption.

As utilized herein, the term "enhance" means to add, increase, improve and/or intensify.

As utilized herein, the term "fiber material" refers to materials comprised substantially of substances which are not fully digested in the human digestive tract. Typical fiber materials include cellulose, hemicellulose, lignin and pectic material.

As utilized herein, the phrase "initial step" refers to a step which is performed prior to all other enumerated steps.

As utilized herein, the terms "ion" and "ionic state" refer to an atom or group of atoms that carry a positive or negative electric charge as a result of having lost or gained one or more electrons.

As utilized herein, the term "pectic material" is employed as a collective designation to refer to protopectin, pectin, pectinate, pectic acid and pectate.

As utilized herein, the term "pulp" refers to that portion of a fruit or vegetable which remains after removal of the juice from the fruit/vegetable and typically includes various ratios of cellulose, hemicellulose, lignin, pectic material, and other water insoluble materials.

As utilized herein, the term "saturate" means to contact a solid with sufficient liquid that the entire surface area of the solid accessible to the liquid is contacted by the liquid. In other words, any further increase in the volume of liquid would produce substantially no additional increase in surface contact between the liquid and the solid.

Fiber Material

The major constituents of typical dietary fiber include cellulose, hemicellulose, lignin, and pectic. The cellulose, hemicellulose and lignin portions are located within the cell structure where they provide support to the cell. The pectic portion is located between cells where it acts as a biological adhesive to hold the cells together.

Cellulose $(C_6H_{10}O_5)_n$ is one of the major polysaccharides of plants where it provides structure to the plant cells. Cellulose is the most abundant organic compound in the biosphere, comprising more than half of all organic carbon. Cellulose is a highly stable, water insoluble, unbranched polysaccharide consisting of glucose units joined by $\beta$-1,4 glycosidic bonds. Sequential glucose units are rotated 180° to permit hydrogen bonding of the ring oxygen of one glucose unit to the 3-OH group of the subsequent unit.. Mammals are not capable of synthesizing cellulases and therefore cannot digest cellulose. However, some ruminants, such as cattle, harbor intestinal cellulase-producing bacterial which permit the digestion of cellulose by these mammals.

Hemicelluloses, despite the name, are carbohydrate polymers which have no chemical relation to cellulose. The name arose because these polysaccharides are commonly associated with cellulose. Typical hemicelluloses include araban and galactin. Like cellulose, mammals are not capable of synthesizing the enzymes necessary to digest hemicellulose.

Lignin is a water insoluble polysaccharide composed of coniferyl, p-coumaryl and sinapyl alcohols in varying ratios dependent upon the plant species. Lignin joins with cellulose and hemicellulose to provide structure to the cell wall.

Pectin is a water soluble, branched polysaccharide consisting of D-galacturonate units joined by $\alpha$-1,4 glycosidic bonds interrupted with 1,2 L-rhamnose residues. The neutral sugars D-galactose, L-arabinose, D-xylose, and L-fucose form side chains from the $\alpha$-1,4 glycosidic backbone. The $\alpha$-1,4 glycosidic backbone includes about 5–10% by weight methylated carboxyl groups and about 5–10% by weight alpha acetyl groups. The molecular weight of pectin varies greatly from about 20,000 for sugar beet pectin up to about 200,000 for apple and citrus pectins.

Sources of dietary fiber suitable for use as the raw material in my process include specifically, but not exclusively, fruits such as apples, lemons, oranges, and grapefruit; vegetables such as carrots, and sugar beets; and grasses such as sugar cane. The preferred raw materials are those which include at least about 5% and most preferably at least about 10% pectic materials.

Treatment Process

Milling

The particle size of the fiber is reduced to increase the surface area of the fiber available for treatment with the calcium ion source.

A wide variety of both wet and dry mills are available for achieving the desired size reduction of the fiber material. One type of mill capable of providing the desired size reduction is a disintegrator. A detailed discussion of the function, design, selection and operation of mills is provided in Perry & Chilton, *Chemical Engineers Handbook*, 5th Ed., pp. 8-35 to 8-42, which is hereby incorporated by reference.

The fiber material is preferably wet milled by dispersing the fiber in water to form an aqueous slurry in order to avoid the dust control problems associated with dry milling of plant fibers.

The fiber material should be milled to a particle size capable of passing through a 5 mesh screen. Particles of greater than about 5 U.S. mesh decrease the rate at which the calcium ions are bonded to the pectin on the fiber due to reduced surface area and frequently leaves a portion of the pectin unreacted.

Insolubilization

The fiber is first treated with a reactant(s) capable of chemically coupling alkaline earth metal ions to the exposed pectin on the fiber. The pectin component of the fiber is thereby rendered substantially water-insoluble.

Treatment with the alkaline earth metal ion source must be conducted at a pH of less than about 7. Contacting the fiber with a source of alkaline earth metal ions at a pH of greater than about 7 causes a substantial portion of the pectin to remain in water-soluble form with a resultant loss in the pectin concentration of the final product.

Without intending to be limited thereby, we believe that the yield of pectic materials in the final product is substantially enhanced as a result of this step because the pectin is prevented from separating from the other fiber components during the remainder of the process by ionically attaching an alkaline earth metal ion to the pectin.

Reactants suitable for use as the source of alkaline earth metal ions include any electrolyte including a dissociable alkaline earth metal ion including specifically, but not exclusively, magnesium chloride, calcium chloride, magnesium sulphate, calcium sulphate, and Nigari.

Saturation of the fiber material with about a 0.01N to about 2N aqueous solution of the alkaline earth metal electrolyte for about one minute to two hours (based upon reaction temperature), preferably about 15 to 30 minutes, at a temperature of about 4°–100° C., preferably about 70°–100° C., will typically result in substantially complete chemical bonding of an alkaline earth metal ion to the available pectin on the fiber material.

Reaction temperature has been found to significantly affect the speed of the reaction. S Generally, the reaction proceeds too slowly to be of practical use at temperatures less than about 4° C. while temperatures above about 100° C. result in flashing of water from the slurry.

The reaction can be conducted at temperatures above about 100° C. by performing the reaction under sufficient pressure to prevent flashing. While the use of treatment temperatures between about 100° to 150° C. would require the use of equipment capable of handling such elevated temperatures and pressures, such as a scrape surface heat exchanger, steam injector, steam infusion system, etc., the use of such elevated temperatures can reduce the reaction time to less than about 1 minute and in many instances to less than about 10 seconds.

The treated fiber material is pressed to remove excess water and those water-soluble pulp components, such as sugars, dissolved in the water. The pressed fiber is then rinsed by resuspending the fiber in water and pressing in order to further remove unwanted water soluble components including those which contribute an off-flavor to the fiber.

Particle Size

The particle size of the treated fiber must be reduced to a size sufficient to permit the fiber to either pass through an ion exchange column or be easily filtered from ion exchange resin added to an aqueous slurry of the fiber.

As with the initial milling step, a wide variety of both wet and dry mills are available for achieving the desired size reduction of the fiber material including a disintegrator.

As with the initial milling steps the fiber material is preferably wet milled in order to avoid the dust control problems associated with dry milling.

The fiber material should be milled to a particle size of about 40 to 150 U.S. mesh, preferably about 80 to 120 U.S. mesh. Particles of greater than about 40 U.S. mesh will tend to plug an ion exchange column and are less effectively treated in an ion exchange column due to the reduced surface area available for contact with the ion exchange resin. Particles of less than about 150 U.S. mesh are difficult to achieve and provide only a minimal increase in the handling and treatability characteristics of the fiber.

Ion Exchange

The milled fiber is suspended in water to form a low viscosity slurry and passed through an ion exchange column in order to effect an exchange of the $Ca^{++}$ ions on the pectin component of the fiber for $H^+$ ions. The ion exchange returns the pectin back to its natural state without separating the pectin from the other insoluble fiber components.

Ion exchange resins suitable for use in the process of this invention are widely available from a number of commercial sources including ALDEX located in Granby, Quebec, Canada. By way of example, one suitable ion exchange resin is ALDEX C-800 available from Aldex.

Alternately, the ion exchange resin may be mixed in with an aqueous slurry of the fiber to effect the exchange of $Ca^{++}$ ions on the pectin with $H^+$ ions. The ion exchange resin may then be separated from the fiber by filtration.

The extent to which the $Ca^{++}$ ions on the pectin are exchanged for $H^+$ ions depends upon a number of variables including the specific ion exchange resin employed, the charged state of the ion exchange resin, the particle size of the fiber, the dwell time of the fiber within the column, the configuration of the ion exchange resin within the column, etc. Generally, a dwell time of about 0.5 to 10 minutes is effective for achieving a substantially complete exchange of the $Ca^{++}$ ions on the milled fiber material.

Progression of the ion exchange process can be monitored by testing the pH of the slurry, For example, when the ion exchange resin is incorporated directly into the slurry, a constant pH reading for the slurry over a three minute period indicates that the exchange of $Ca^{++}$ ions for $H^+$ ions has been completed and ion exchange resin may be removed.

Removal of Water

Excess water may be removed by any of the well known conventional methods including filtration, reverse osmosis, pressing, etc.

The crude pectic material containing product may then be dried to a storage stable water content of less than about 8 wt % by any of the conventional drying techniques such as vacuum drying, freeze drying, drum drying, spray drying, oven drying, etc.

The pH of the dried crude pectic material containing product may be optionally adjusted towards a neutral a pH, preferably to a pH of between about 4 and 7, by the addition of a basic compound such as sodium hydroxide at any time after exchanging the alkaline earth metal ions for hydrogen ions.

The resultant product is a crude pectic material containing product comprised primarily of the dietary fibers cellulose, hemicellulose, lignin and pectin which is effective as a gelling agent in foodstuffs.

I claim:

1. A process for manufacturing a crude pectic material containing product, comprising the steps of:
   (a) treating edible pectin-containing fiber with a source of alkaline earth metal ions under conditions effective for increasing the concentration of alkaline earth metal ions chemically coupled to the pectin component of the fiber;
   (b) separating the treated fiber into a pectin-rich solid fraction and a pectin-poor liquid fraction;
   (c) exchanging the alkaline earth metal ions chemically coupled to the pectin component of the fiber in the solid fraction with hydrogen ions;
   (d) removing water from the ion exchanged solids fraction to form a dry, storage stable crude-pectic material containing product.

2. The process of claim 1 further comprising the step of reducing the particle size of the solid fraction to less than 40 mesh prior to the step of exchanging the alkaline earth metal ions with hydrogen ions.

3. The process of claim 2 wherein the step of reducing the particle size of the solid fraction is conducted prior to the step of separating the fiber into solids and liquid fractions and after the step of treating the fiber with a source of alkaline earth metal ions.

4. The process of claim 2 wherein the step of reducing the particle size of the solid fraction is conducted prior to the step of exchanging the alkaline earth metal ions for hydrogen ions and after the step of separating the fiber into solids and liquid fractions.

5. The process of claim 1 further comprising the step of dispersing the fiber in water to form an aqueous slurry prior to the step of separating the solid and liquid fractions.

6. The process of claim 1 wherein the fiber is saturated with water when treated with a source of alkaline earth metal ions.

7. The process of claim 1 further comprising the step of dispersing the separated solid fraction in water to form a second aqueous slurry prior to the step of exchanging the alkaline earth metal ions for hydrogen ions.

8. The process of claim 1 further comprising the step of adjusting the pH of the ion exchanged solid fraction to a pH of about 4 to 7.

9. The process of claim 8 wherein the step of adjusting the pH of the solid fraction of the fiber to a pH of about 4 to 7 is conducted prior to the step of removing water from the solid fraction and after the step of exchanging the alkaline earth metal ions for hydrogen ions.

10. The process of claim 1 wherein the step of treating edible pectin-containing fiber comprises treating edible fiber comprising at least 5% pectin.

11. The process of claim 1 wherein the step of treating edible pectin-containing fiber comprises treating edible fiber comprising at least 10% pectin.

12. The process of claim 1 wherein the step of treating edible pectin-containing fiber with a source of alkaline earth metal ions comprises treating fiber with a source of calcium ions.

13. The process of claim 1 wherein the step of treating edible pectin-containing fiber with a source of calcium ions comprises treating fiber with calcium chloride at a pH of less than 7.

14. The process of claim 1 wherein the step of treating edible pectin-containing fiber comprises the step of treating fiber obtained from a food selected from the group consisting of apples, carrots, lemons, grapefruit, oranges, sugarbeet, and sugar cane.

15. A process for manufacturing a crude pectic material containing product, comprising the sequential steps of:

(a) saturating an edible pectin-containing fiber material with an aqueous solution containing alkaline earth metal ions under conditions effective for increasing the concentration of alkaline earth metal ions chemically coupled to the pectin component of the fiber;

(b) separating the treated fiber into a pectin-rich solid fraction and a pectin-poor liquid fraction;

(c) dispersing the separated solid fraction in water to form an aqueous slurry;

(e) milling the solids contained in the second slurry to a particle size of less than 40 mesh;

(f) exchanging the alkaline earth metal ions chemically coupled to the pectin component of the milled solid fraction with hydrogen ions to form a crude-pectin product;

(g) adjusting the pH of the crude-pectin product to about 4 to 7; and (h) removing water from the pH adjusted crude-pectin product.

* * * * *